United States Patent
Jin (10) Patent No.: US 9,313,070 B2
(45) Date of Patent: Apr. 12, 2016

(54) BURST NOISE DETECTION AND PILOT SELECTION

(71) Applicant: Cisco Technology, Inc., San Jose, CA (US)

(72) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 14/155,859

(22) Filed: Jan. 15, 2014

(65) Prior Publication Data

US 2015/0201422 A1    Jul. 16, 2015

(51) Int. Cl.
*H04L 27/26* (2006.01)
*H04B 17/345* (2015.01)
*H04L 5/00* (2006.01)

(52) U.S. Cl.
CPC .......... *H04L 27/2647* (2013.01); *H04L 5/0048* (2013.01); *H04B 17/345* (2015.01)

(58) Field of Classification Search
None
See application file for complete search history.

(56) References Cited

U.S. PATENT DOCUMENTS

| | | | |
|---|---|---|---|
| 6,904,550 B2 * | 6/2005 | Sibecas ................. | H04L 5/0007 370/522 |
| 7,813,433 B2 | 10/2010 | Moffatt | |
| 8,160,166 B2 | 4/2012 | Moffatt et al. | |
| 8,165,232 B2 | 4/2012 | Moffatt et al. | |
| 8,189,697 B2 | 5/2012 | Moffatt et al. | |
| 8,457,675 B2 | 6/2013 | Miyabayashi | |
| 2007/0060178 A1 * | 3/2007 | Gorokhov ............. | H04L 5/1438 455/506 |
| 2008/0043861 A1 | 2/2008 | Moffatt | |
| 2008/0207143 A1 * | 8/2008 | Skarby ................. | H04B 1/0475 455/103 |
| 2010/0034219 A1 | 2/2010 | Stadelmeier | |

FOREIGN PATENT DOCUMENTS

KR       2009055100  A  * 10/2009 .............. H04L 27/38

* cited by examiner

*Primary Examiner* — Hoon J Chung
*Assistant Examiner* — Zhensheng Zhang
(74) *Attorney, Agent, or Firm* — Edell, Shapiro & Finnan, LLC (57) ABSTRACT

Techniques are presented herein for detecting burst noise in a received orthogonal frequency division multiplex (OFDM) transmission. An OFDM transmission is received that includes pilots transmitted at different instances of time but on the same subcarrier during a predetermined time interval such that there are a plurality of different pairs of pilots that are on the same subcarriers during the predetermined time interval. For each possible pair of pilots, an equalized pilot is generated using received values for first and second pilots of the pair. A signal-to-noise ratio is computed for each equalized pilot. A determination is made as to which pilots, if any, are affected by burst noise by comparing the signal-to-noise ratio among the plurality of equalized pilots. Pilots determined to be affected by burst noise are removed from a channel response computation.

17 Claims, 9 Drawing Sheets

FIG. 9B

BURST NOISE DETECTION AND PILOT SELECTION

TECHNICAL FIELD

The present disclosure relates to orthogonal frequency division multiplexed (OFDM) communication techniques.

BACKGROUND

Many communication systems use orthogonal frequency division multiplexed (OFDM) communication techniques. OFDM communication involves dividing a frequency bandwidth of a signal into frequency divisions or subcarriers, and the subcarriers are modulated with data for transmission from a transmitter to a receiver in a communication channel. The communication channel is, for example, an over-the-air channel, an optical fiber or a coax cable. Some of the subcarriers are also allocated to transmit a priori known values to enable channel estimation at the receiver. The subcarriers that carry known values are known as pilot subcarriers.

DESCRIPTION OF EXAMPLE EMBODIMENTS

Overview

Techniques are presented herein for detecting burst noise in a received orthogonal frequency division multiplex (OFDM) transmission. An OFDM transmission is received that includes pilots transmitted at different instances of time but on the same subcarrier during a predetermined time interval such that there are a plurality of different pairs of pilots that are on the same subcarriers during the predetermined time interval. For each possible pair of pilots, an equalized pilot is generated using received values for first and second pilots of the pair. A signal-to-noise ratio is computed for each equalized pilot. A determination is made as to which pilots, if any, are affected by burst noise by comparing the signal-to-noise ratio among the plurality of equalized pilots. Pilots determined to be affected by burst noise are removed from a channel response computation.

Example Embodiments

The Data Over Cable Service Interface Specification (DOCSIS) is a communication protocol that is used to send digital video and data from a hub or headend facility (HEF) to a cable modem (CM) at a customer premise. Digital video is a one-way or downstream application from the hub to the cable modem, e.g., a television program, while data services are two-way (downstream and upstream) applications, e.g., Internet Protocol (IP) web browsing or IP telephony. For downstream transport, both digital video and data may be encapsulated using the DOCSIS and Motion Picture Experts Group (MPEG) protocols prior to transport. For cable modem operations, a CMTS is typically deployed in a HEF or hub that is configured to manage and support programming and Internet services for a plurality of CMs.

DOCSIS version 3.1 expands upon existing DOCSIS protocol standards and deployed systems by way of OFDM technology. OFDM involves dividing a given frequency space into a plurality of orthogonal subcarriers. For example, in a cable system, video and data may be transmitted on a single or multiple (bonded) physical channels, such as 6-8 MHz wide quadrature amplitude modulator (QAM) channels for downstream transmissions. Upstream transmissions may use the same or a different RF transmission scheme. OFDM subdivides that RF space into a plurality of subcarriers that each comprises a small portion of the spectrum. For example, a subcarrier may comprise 25 or 50 kilohertz (kHz) of radio frequency (RF) bandwidth. Each subcarrier is modulated orthogonally with respect to other subcarriers such that tens or hundreds of subcarriers may be used over a 6 MHz RF channel while limiting inter-subcarrier interference. By way of example, a 6 MHz physical channel may be divided into 25 kHz wide subcarriers which yields 240 potential subcarriers (6 MHz/25 kHz=240 available subcarriers). In another example, in DOCSIS3.1, the channel bandwidth varies from 24 MHz to 96 MHz.

Figure 1:
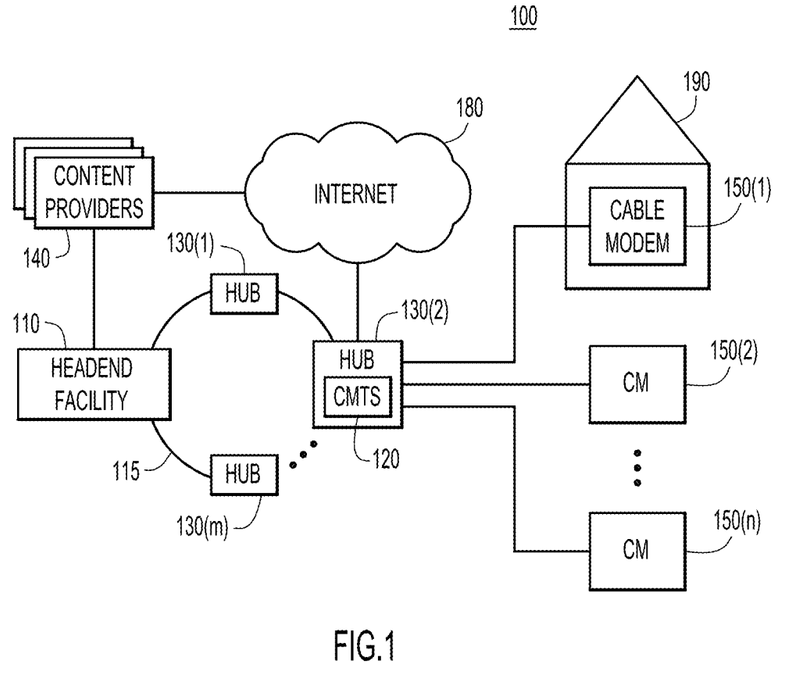
FIG. 1 is a diagram of an example cable distribution system in which the burst noise detection and pilot selection techniques according to the techniques presented herein may be used.

FIG. 1 shows an example cable system or network 100 that employs OFDM-based transmission techniques as part of the DOCSIS communication standard. Specifically, system 100 includes a headend facility (HEF) 110, a network 115, a plurality of hubs 130(1)-130(m), and a plurality a cable modems (CMs) 150(1)-150(n) with CM 150(1) residing in a customer premise 190. Hub 130(2) houses a CMTS 120.

The HEF 110 is connected to various content providers 140 for providing media content (e.g., movies, television channels, etc.). The media content is distributed by HEF 110 to hubs 130 via network 115 (e.g. a synchronous optical network (SONET), synchronous digital hierarchy (SDH) network, or IP network). The content is further distributed by hubs 130 to the plurality of CMs 150(1)-150(n) in the form of conventional digital video or IP television services.

Each of hubs 130(1)-130(m) may also be connected to Internet 180 (via HEF 110) for providing Internet and telephony services (e.g., to and from customer premise 190). Media content may also be distributed by content providers 140 via Internet 180.

The CMs 150(1)-150(n) act as a bridge between the cable network and the home network (not shown) for providing data services (e.g., Internet, telephony, IP television services, etc.). In the context of this disclosure, CM 150(1) may be DOCSIS/EuroDOCSIS compliant (version 3.1 or greater). DOCSIS 3.1 makes use of OFDM technology to increase service provider flexibility and RF spectral efficiency. It will be appreciated that other CMs throughout system 100 may not be DOCSIS 3.1 compliant.

Figure 2:
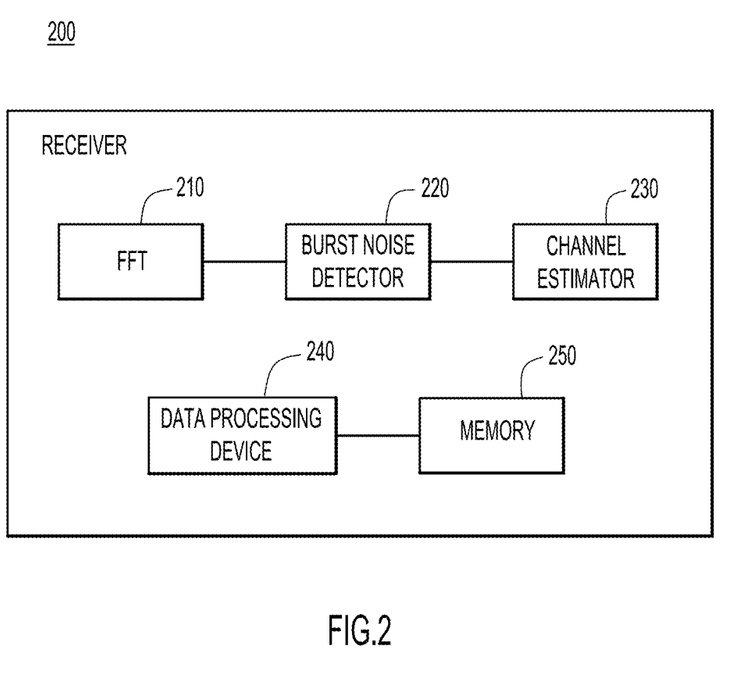
FIG. 2 is an example block diagram of a receiver in which the burst noise detection and pilot selection techniques may be used.

FIG. 2 is a block diagram illustrating further details of a portion of a receiver of a CM, e.g., any of the CMs shown in FIG. 1. The receiver, shown at reference numeral 200, includes a Fast Fourier Transform (FFT) module 210, a burst noise detector 220 and a channel estimator 230. Following the channel estimator 230 are other components, such as an equalizer, a deinterleaver, a decoder, etc., but for simplicity these components are not shown in FIG. 2 because they do not pertain to the burst noise detection techniques presented herein.

The FFT module 210 converts a time-domain receive signal into values for a plurality of frequency bins that span a frequency band of interest. It is from the output of the FFT module that received values on individual OFDM subcarriers can be derived. The burst noise detector 220 evaluates the received values on the OFDM subcarriers, and in particular on pilot subcarriers, in order to detect burst noise, and to remove any pilot subcarriers on which burst noise is detected. The channel estimator 230 performs analysis on the pilot subcarriers, which have not been removed by the burst noise detector 220, to generate data that characterizes the channel conditions on the communication medium over which an OFDM signal was transmitted.

The receiver 200 may include a data processing device 240 and memory 250. The data processing device 240 is, for example, a microprocessor, a microcontroller, systems on a chip (SOCs), or other fixed or programmable logic. The data processing device 240 is also referred to herein simply as a processor. The memory 250 may be any form of random access memory (RAM) or other tangible (non-transitory) memory media that stores data or instructions used for the techniques described herein. The memory 250 may be separate or part of the processor 250. The functions of the burst noise detector 220 and/or channel estimator 230 may be performed by instructions stored in memory 250 and executed by the data processing device 240.

The functions of the processor 240 may be implemented by a tangible processor or computer readable (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 250 stores data used for the computations or functions described herein (and/or to store software or processor instructions that are executed to carry out the computations or functions described herein).

In DOCSIS 3.1, an allocation unit (for the version approved for use in the United States) is a mini-slot. Each mini-slot consists of a rectangular cell cluster in a 2-dimensional symbol-subcarrier space. The size of the mini-slot is k symbols by q sub-carriers, where k is the frame length, k is a positive integer, and varies depending on actual deployment scenarios. q equals 8 and 16, respectively, for 50 kHz and 25 kHz carrier spacing. Within a mini-slot, some of the cells are pilots that are used for channel estimations. Each pilot is binary phase shift key (BPSK) modulated with known pseudorandom binary sequence (PRBS).

There are four options of pilot patterns that are selectable by CMTS. Each option has two types: edge pilot pattern for edge mini-slot, and body pilot pattern for body mini-slot.

Figure 3:
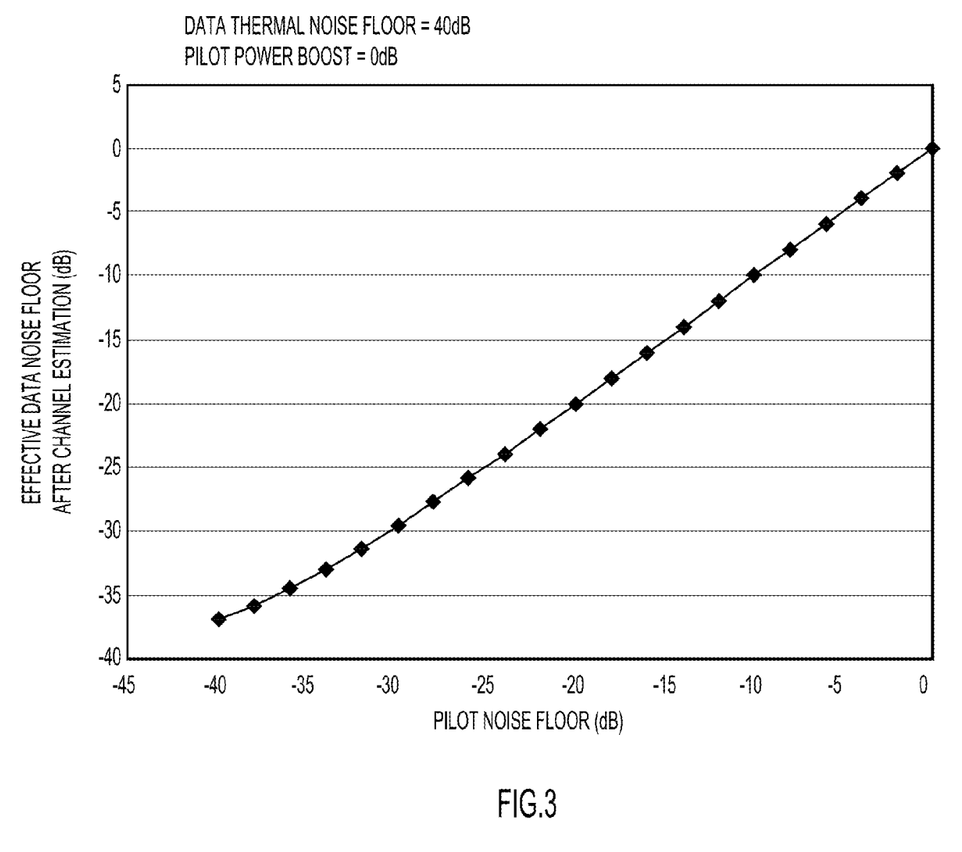
FIG. 3 is a diagram illustrating a relationship between effective data noise floor and pilot noise floor.

Pilots are used to remove the channel effects from data contained in a transmission. However, at the same time, they add noise to the data as well. As shown in FIG. 3, pilots have an impact on data signal-to-noise ratio (SNR) in two competing ways. Pilots remove channel effects, which can result in an increase in SNR. Pilots also add noise, having the effect of reducing data SNR.

The noise level at each pilot is observed in order to decide if the pilot should be included in the channel estimation so as to have net gain on data SNR. This is particularly important with DOCSIS 3.1 (US), in which the burst noise can significantly impair the pilots. Burst noise could occur with relatively large magnitude, short duration (a few microseconds (μsec), and occupying a relatively large bandwidth (more than 10 MHz). Once pilots are determined to be affected by burst noise, they should not be used for channel estimation as they could add significant noise to the data and cause considerable drop on data SNR. Pilots are said to be affected by burst noise if certain conditions are met based on the pilot SNR estimation techniques described herein. To assess if a pilot should be included in the channel estimation computation, it is detected whether there is a burst noise occurring on pilot symbols. If there is burst noise present with a level higher than a threshold, the pilots so affected by the burst noise are not included in the channel estimation computation. Presented herein are techniques for burst noise detection and pilot selection.

Burst noise, as described above, is usually relatively wideband in nature and will affect all pilots within a relatively wide frequency bandwidth at a particular symbol time interval. According to the techniques presented herein, at each symbol having embedded pilots, multiple pilots from multiple mini-slots over a wide bandwidth are used to detect if burst noise exists. The burst noise is detected by estimating an effective SNR for all pilots at a particular symbol time. The pilot SNR estimation techniques leverage the following characteristics: pilot modulation is Binary Phase Shift Key (BPSK); timing and frequency offsets cause only phase variation to pilot symbols; any subcarrier that contains complementary pilots contains two pilots as well.

Figure 4:
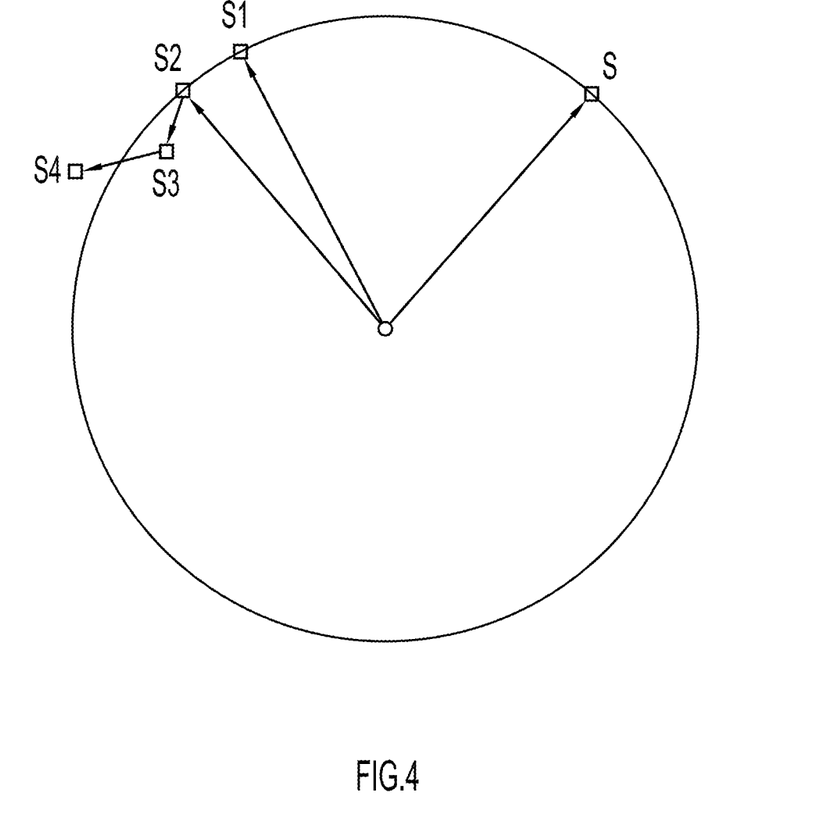
FIG. 4 is a diagram illustrating a paradigm that represents the effects of noise on pilot subcarriers.

Turning to FIG. 4, a diagram is shown that represents a pilot symbol trajectory in view of the various sources of noise. In FIG. 4, S represents the ideal BPSK pilot symbol. S1 represents the received symbol as affected by timing offset/phase drift between the transmitter and receiver, where $S1=Se^{j\Phi}$. S2 represents the received symbol as affected by frequency offset/phase drift between the transmitter and receiver, where $S2=S1e^{j\phi}=Se^{j(\Phi+\phi)}$. S3 represents the received symbol as affected by burst/thermal noise in the communication channel, where $S3=S2+n=Se^{j(\Phi+\phi)}+n$, where n is the burst/thermal noise. S4 represents the received symbol as affected by channel response conditions of the communication channel, where $S4=hS3=hSe^{j(\Phi+\phi)}+n'$, where h represents the channel response. The timing and frequency offsets cause phase changes only, whereas channel response conditions cause significant changes to both phase and amplitude (magnitude). It is necessary to eliminate all of the non-noise related effects so that the effect of the noise, causing S2 to move to S3, can be separated out and assessed correctly.

Figure 5:
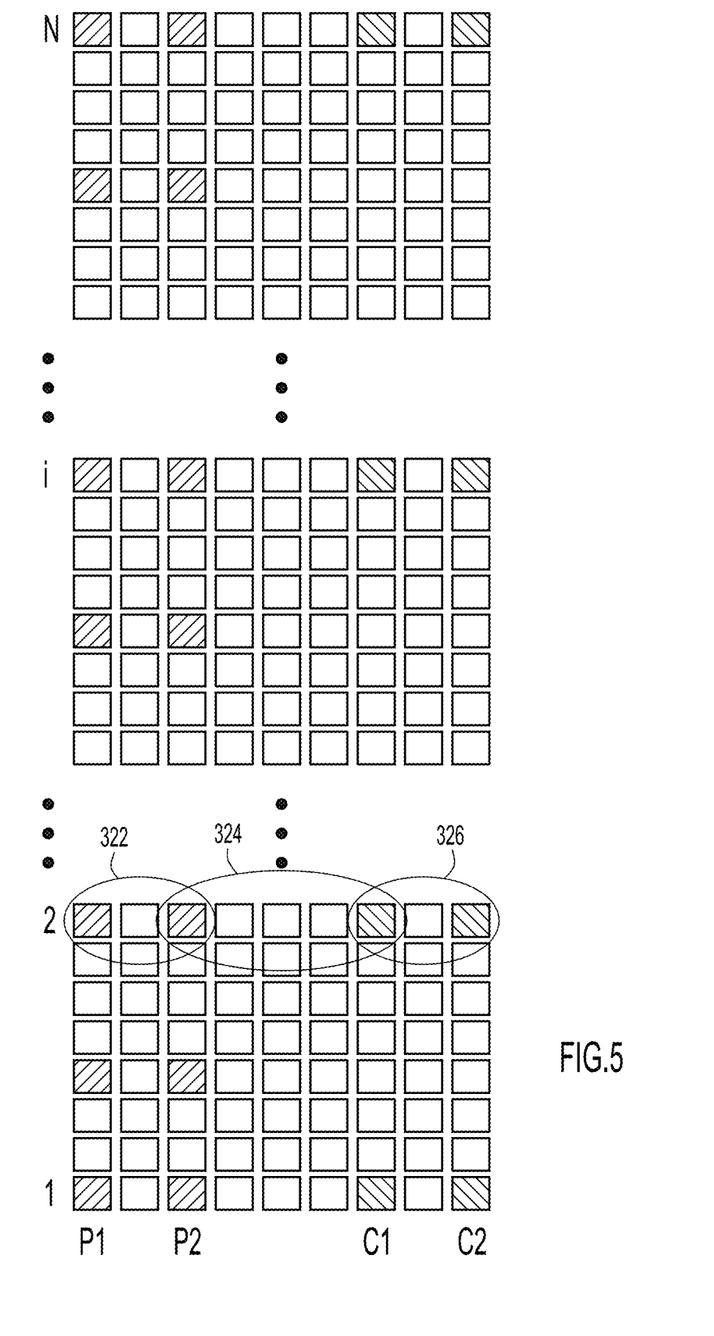
FIG. 5 is an example diagram of subcarrier pilot assignment, and for which the techniques presented herein may be used.

Reference is now made to FIG. 5. FIG. 5 shows an example pilot pattern that is one of the several patterns available for use in DOCSIS 3.1. There are four columns of pilots, among them, two are pilots, and two are complementary pilots. The first column of pilots is denoted $P1(i)$, $i=1$ to N, where the index i runs on the subcarriers that contain complementary pilots, and N is the maximum number of pilots contained in the computation. On the subcarrier that contains complementary pilots, there are two pilots as well. Similarly, the second column is denoted $P2(i)$, the first complementary pilots as $C1(i)$, and the second complementary pilots as $C2(i)$.

Figure 6:
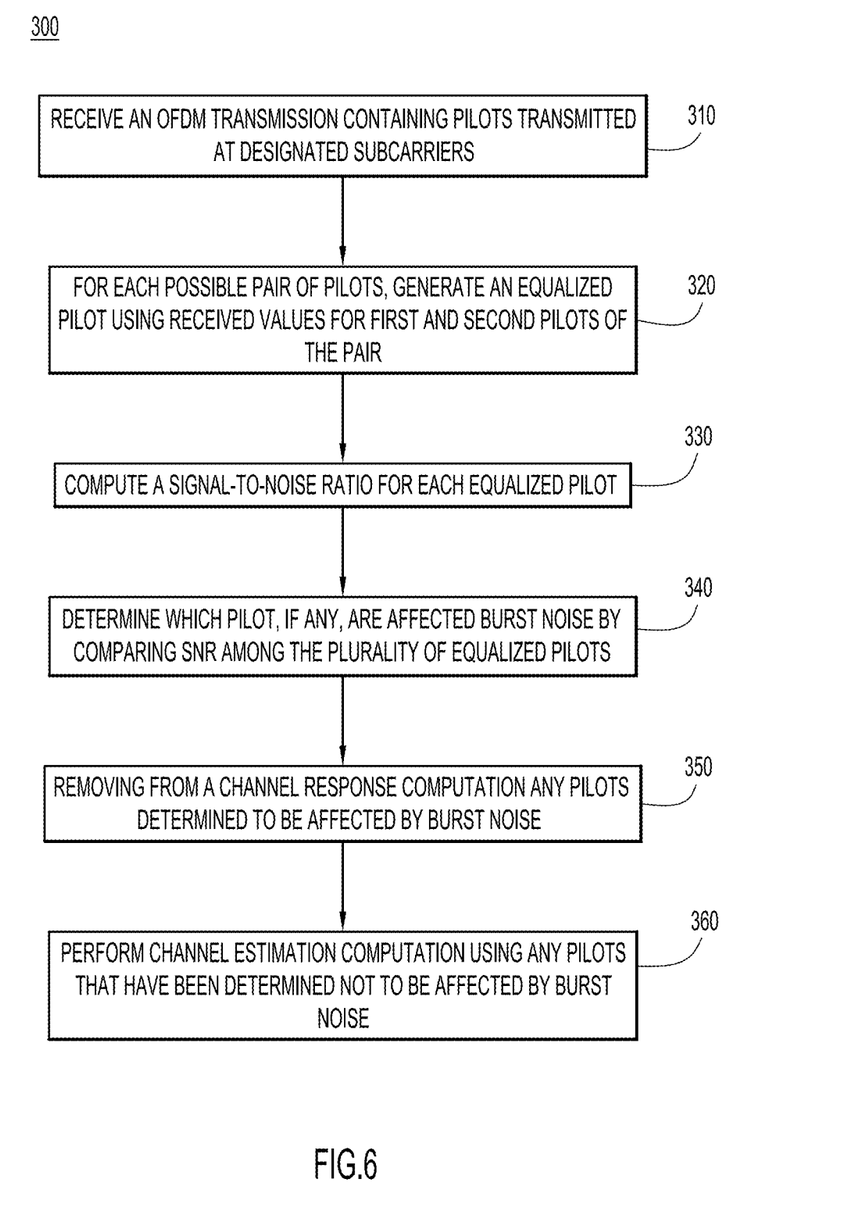
FIG. 6 illustrates a flow chart depicting the operations of the burst noise and pilot selection techniques.

Techniques are presented herein to exploit the occurrence of pilots on common subcarriers to determine which pilots are impacted by burst noise. Reference is now made to FIG. 6, with continued reference to FIG. 5 and to FIG. 7 as well. FIG. 6 shows steps for a method 300 to detect burst noise on pilots and select pilots not impacted by burst noise for channel estimate computations. At 310, an OFDM transmission containing pilots on designated subcarriers is received. More specifically, the received transmission contains pilots transmitted at different instances of time but on the same subcarrier during a predetermined time interval such that there are multiple different pairs of pilots that are on the same subcarriers during the predetermined time interval.

At 320, for each possible pair of pilots, an equalized pilot is generated using received values for first and second pilots of the pair. In other words, in each pair of pilots, one pilot is used to equalize the other (by a division computation). FIG. 5 shows, for subcarrier index "2", examples of pairs of pilots on the same subcarriers. At 322, there is a pilot pair for P1 and P2; at 324 there is a pilot pair for P2 and C1, and at 326 there is a pilot pair for C1 and C2. While not specifically called out in FIG. 5, there is also a pilot pair for P1 and C1, a pilot pair for P1 and C2 and a pilot pair for P2 and C2. A similar pairing can be made for the other subcarriers where there are pilots on the same subcarriers, as shown in FIG. 5.

For the pilot pair P1 and P2 an equalized pilot P1_P2 is computed by the division computation, P1_P2=P2/P1. Similarly, an equalized pilot P1_C1=C1/P1 is computed for the pilot pair P1 and C1. An equalized pilot P1_C2=C2/P_1 is computed for the pilot pair P1 and C2. An equalized pilot P2_C1=C1/P2 is computed for the pilot pair P2 and C1, and an equalized pilot P2_C2=C2/P2 is computed for the pilot pair P2 and C2. The computation above is to use P1 to equalize P2, C1, and C2; and P2 to C1 and C2, in order to remove channel response effects since the channel response effects essential cancel each other out in the division computation because the channel response effects are the same at common subcarriers. In order words, P1_P2, P1_C1, P1_C2, P2_C1 and P2_C2 each contain no channel effects.

Figure 7:
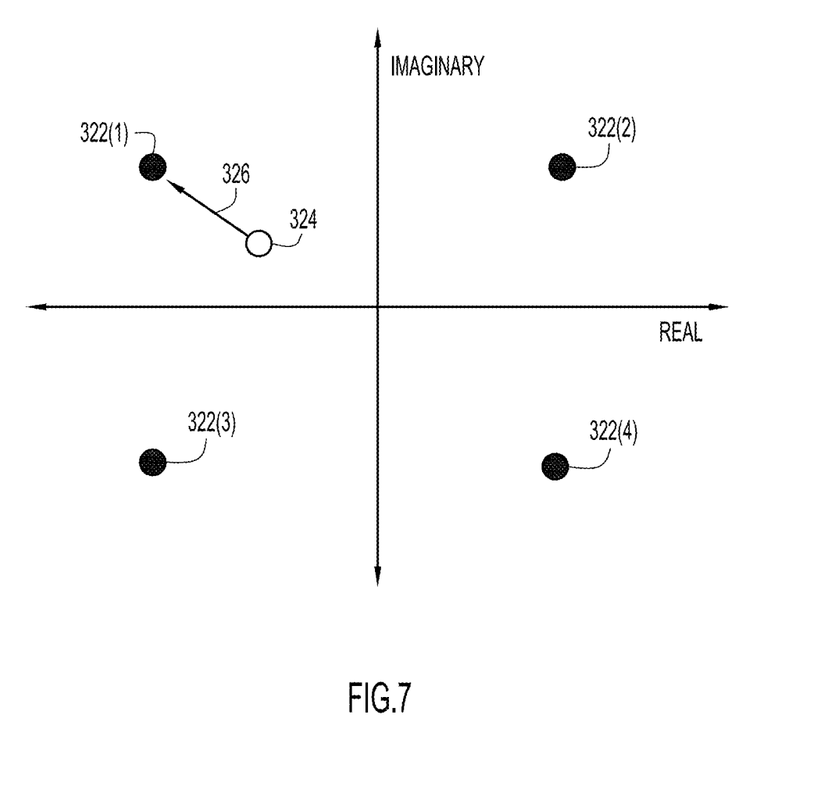
FIG. 7 is a diagram of an example signal constellation and illustrating how a signal-to-noise ratio is computed for each equalized pilot.

At 330, a signal-to-noise ratio is computed for each equalized pilot (e.g., P1_P2, P1_C1, P1_C2, P2_C1 and P2_C2), computed at 320. More specifically, the closest point in a reference signal constellation is determined for each equalized pilot, as well as an error between the equalized pilot and its closest point in the reference signal constellation. Reference is now made to FIG. 7 for a further description of this operation. FIG. 7 shows a simplified example constellation comprising constellation points 322(1)-322(4) and an equalized pilot at 324. For example, the equalized pilot may be P1_P2. The closest point in the constellation to equalized pilot 324 is constellation point 322(1). The distance 326 to constellation point 322(1) from equalized pilot 324 represents the error between the equalized pilot 324 and the closest constellation point 322(1).

Figure 8:
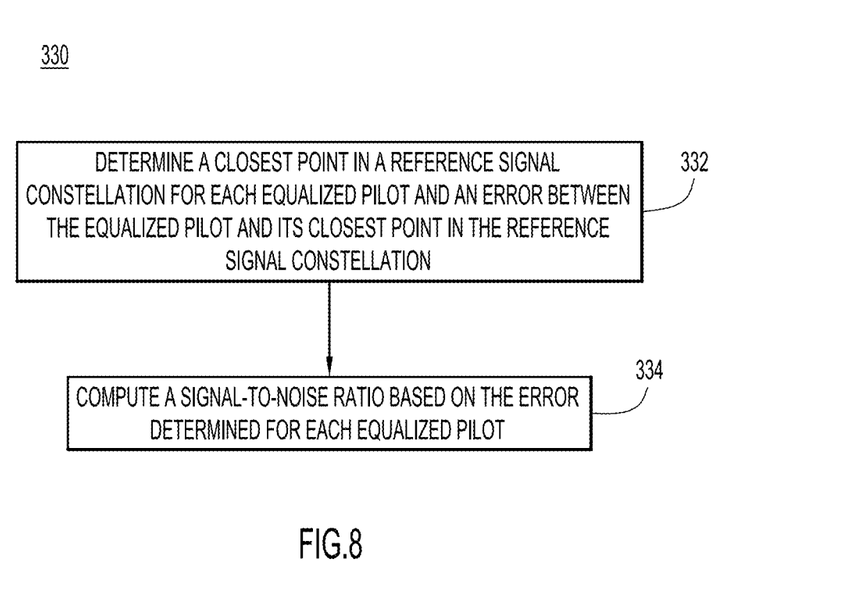
FIG. 8 is a flow chart depicting additional operations performed for the burst noise and pilot selection techniques.

Thus, as shown in FIG. 8, at operation 330, in order to compute the SNR for each equalized pilot, at 332, a determination is made of a closest point in the reference signal constellation for each equalized pilot and an error is determined between the equalized pilot and its closest point in the reference signal constellation. At 334, a signal-to-noise ratio (SNR) is computed based on the error determined for each equalized pilot.

There are many ways to compute the SNR. One way involves computing a magnitude of the error and then computing the SNR based on the magnitude of the error. To do this, absolute values are computed for the equalized pilots, e.g., P1_P2, P1_C1, P1_C2, P2_C1 and P2_C2. To compute the estimated SNR, the following computation is made:

$$S\_snr = sum(abs(S\_r)^2)/sum((abs(S)-abs(S\_r))^2)$$

where $S$ is one of equalized pilots P1_P2, P1_C1, P1_C2, P2_C1 and P2_C2, and $S\_r$ is its corresponding reference point.

At 340, a determination is made as to which pilots, if any, are affected by burst noise by comparing the SNR among the plurality of pilot pairs. In the following slides, P1_P2, P1_C1, P1_C2, P2_C1 and P2_C2 are used to represent the estimated SNRs for simplicity. The columns of pilots that are affected by burst noise can be readily determined as follows.

Select the equalized pilot that has the highest SNR, and denote it as P_r (reference), and set a predetermined difference value delta=5 dB, or some other value. If P1_P2=P_r, which means P1 and P2 are clean (not affected by burst noise), then a check is made of C1 and C2:

If P1_C1<=P_r−delta, C1 is deemed affected by burst noise and is removed.

If P1_C2<=P_r−delta, C2 is deemed affected by burst noise and is removed.

If P1_C1=P_r, which means P1 and C1 are clean, then a check is made of P2 and C2:

If P1_P2<=P_r−delta, P2 is deemed affected by burst noise and is removed.

If P1_C2<=P_r−delta, C2 is deemed affected by burst noise and is removed.

If P1_C2=P_r, which means P1 and C2 are clean, then a check is made of P2 and C1:

If P1_P2<=P_r−delta, P2 is deemed affected by burst noise and is removed.

If P1_C1<=P_r−delta, C1 is deemed affected by burst noise and is removed.

If P2_C1=P_r, which means P2 and C1 are clean, then a check is made of P1 and C2:

If P1_P2<=P_r−delta, P1 is deemed affected by burst noise and is removed.

If P2_C2<=P_r−delta, C2 is deemed affected by burst noise and is removed.

If P2_C2=P_r, which means P2 and C2 are clean, then a check is made on P1 and C1:

If P1_P2<=P_r−delta, P1 is deemed affected by burst noise and is removed.

If P2_C1<=P_r−delta, C1 is deemed affected by burst noise and is removed.

More specifically, any pilot is removed from the channel response computation if its pilot pair has an SNR lower than that of the other pilot pairs by a predetermined amount (delta). That is, determining one or more pilots that are affected by burst noise involves determining, for each pilot pair, if it has a signal-to-noise ratio lower than that of other pilot pairs by a predetermined amount (delta) in the plurality of different pairs of pilots.

At 350, any pilots that are determined to have been affected by burst noise are flagged to be removed, and thus not included in any channel response computation. At 360, the channel response computation is performed, without any pilots that were flagged to be removed at operation 350.

In summary, these techniques can apply in all cases regardless of channel conditions and burst noise levels. A selection is made of a pair of the pilot columns that has the highest SNR, and all the pilots with a SNR that is/are lower by a predetermined amount are removed/ignored for purposes of channel response computations. In the worst case where all the pilots are affected by burst noise (which is very unlikely), these techniques can pick out one pair of the pilot columns with the highest SNR and use them for channel estimation. The channel estimation may have a poor performance due to burst noise in this case, but it is still better than using all the pilots blindly regardless of their SNR.

Figure 9A:
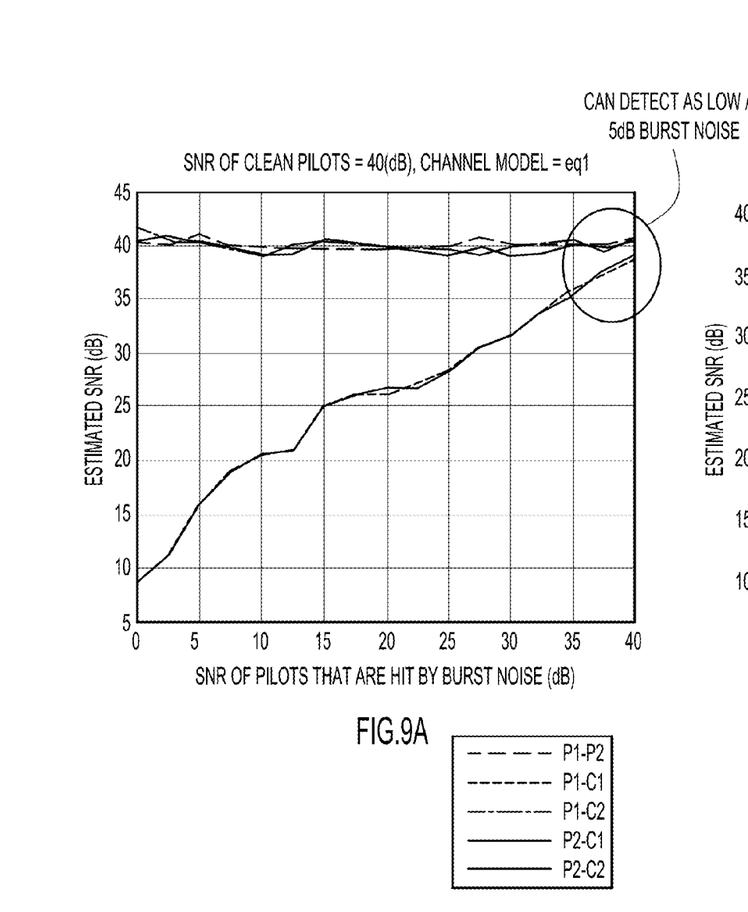
FIGS. 9A and 9B are plots illustrating the benefits of removing pilot subcarriers affected by burst noise from channel estimate computations.
Figure 9B:
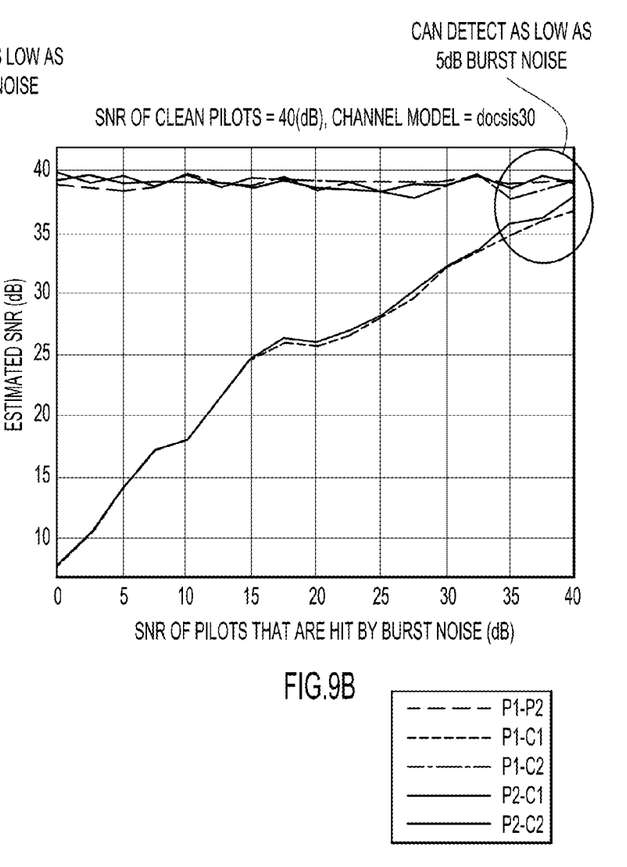

Reference is now made to FIGS. 9A and 9B. The algorithm has removed the channel effect completely, and is very sensitive to burst noise. FIG. 9A shows an example of SNR measurements made according to one channel model, called "eq1" whereas FIG. 9B shows an example of SNR measurements made according to the DOCSIS 3.0 channel model. The SNR estimation techniques presented herein works regardless of channel models. The algorithm is very sensitive to the burst noise, can detect burst noise as low as 5 dB above the thermal noise floor. In the simulation, the burst noise affects complementary pilot C1, causing P1_C1 and P2_C1 to change with burst noise level. Thus, these techniques can detect the burst noise buried deeply under signal and as low as 5 dB above the thermal noise floor.

The relationship between estimated and true SNRs is not perfectly linear. However, this is not an issue because the estimated SNR is to determine if the pilots are affected by burst noise, not to have the exact SNR of pilots. As long as there is a distinctive gap between the SNR of clean pilots and polluted pilots, these techniques work well.

The burst noise detection procedures presented herein may be executed at least for every 10 mini-slots, which corresponds to 4 MHz of bandwidth. The number of mini-slots per segment will be configurable in actual implementation (10, 20, 30, 40, 50, 60 (4, 8, 12, 16, 20, 24 MHz)).

To further summarize, a method is provided comprising: receiving an orthogonal frequency division multiplex transmission including pilots transmitted at different instances of time but on the same subcarrier during a predetermined time interval such that there are a plurality of different pairs of pilots that are on the same subcarriers during the predetermined time interval; for each pair of pilots, generating an equalized pilot using received values for first and second pilots of the pair; computing a signal-to-noise ratio for each equalized pilot; determining which pilots, if any, are affected by burst noise by comparing the signal-to-noise ratio among the plurality of equalized pilots; and removing from a channel response computation any pilots determined to be affected by burst noise.

In accordance with another form, a method is provided comprising: receiving an orthogonal frequency division multiplex transmission including pilots transmitted at different instances of time but on the same subcarrier during a predetermined time interval such that there are a plurality of different pairs of pilots that are on the same subcarriers during the predetermined time interval; for each pair of pilots, generating an equalized pilot using received values for first and second pilots of the pair; computing a signal-to-noise ratio for each equalized pilot; determining which pilots, if any, are affected by burst noise by, for each possible pilot pair, determining if a pilot pair has a signal-to-noise ratio lower than that of other pilot pairs in the plurality of different pairs of pilots; and performing a channel response computation without any pilots determined to be affected by burst noise.

Furthermore, an apparatus is provided comprising: a transform module configured to convert a time-domain receive signal associated with reception of an orthogonal frequency division multiplex transmission into values for a plurality of frequency bins that span a frequency band of interest, the orthogonal frequency division multiplex transmission including pilots transmitted at different instances of time but on the same subcarrier during a predetermined time interval such that there are a plurality of different pairs of pilots that are on the same subcarriers during the predetermined time interval; and a processor configured to: for each possible pair of pilots, generate an equalized pilot using received values for first and second pilots of the pair; compute a signal-to-noise ratio for each equalized pilot; determine which pilots, if any, are affected by burst noise by comparing the signal-to-noise ratio among the plurality of equalized pilots; and remove from a channel response computation any pilots determined to be affected by burst noise.

Further still, a computer readable storage media is provided that is encoded with instructions that, when executed by a processor (e.g., microprocessor or microcontroller), the processor is operable to: for a received orthogonal frequency division multiplex transmission including pilots transmitted at different instances of time but on the same subcarrier during a predetermined time interval such that there are a plurality of different pairs of pilots that are on the same subcarriers during the predetermined time interval, generate, for each pair of pilots, an equalized pilot using received values for first and second pilots of the pair; compute a signal-to-noise ratio for each equalized pilot; determine which pilots, if any, are affected by burst noise by comparing the signal-to-noise ratio among the plurality of equalized pilots; and remove from a channel response computation any pilots determined to be affected by burst noise.

The above description is intended by way of example only. Various modifications and structural changes may be made therein without departing from the scope of the concepts described herein and within the scope and range of equivalents of the claims.

What is claimed is:

1. A method comprising:
receiving an orthogonal frequency division multiplex transmission including pilots transmitted at different instances of time but on the same subcarrier during a predetermined time interval such that there are a plurality of different pairs of pilots that are on the same subcarriers during the predetermined time interval;
for each pair of pilots, generating an equalized pilot using received values for first and second pilots of the pair by dividing a received value for the second pilot by a received value for the first pilot;
computing a signal-to-noise ratio for each equalized pilot;
determining which pilots, if any, are affected by burst noise by comparing the signal-to- noise ratio among the plurality of equalized pilots; and
removing from a channel response computation any pilots determined to be affected by burst noise.

2. The method of claim 1, wherein computing the signal-to-noise ratio comprises:
determining a closest point in a reference signal constellation for each equalized pilot and an error between the equalized pilot and its closest point in the reference signal constellation; and
computing the signal-to-noise ratio based on the error determined for each equalized pilot.

3. The method of claim 2, wherein computing the signal-to-noise ratio comprises computing a magnitude of the error for each equalized pilot, and computing the signal-to-noise ratio based on the magnitude of the error.

4. The method of claim 1, where determining which pilots are affected by burst noise comprises determining, for each pilot pair, if the equalized pilot of a pilot pair has a signal-to-noise ratio lower than that of the equalized pilot of other pilot pairs in the plurality of different pairs of pilots.

5. The method of claim 1, wherein determining which pilots are affected by burst noise comprises selecting a pilot pair whose equalized pilot has a highest signal-to-noise ratio, designating pilot pairs having an equalized pilot with a signal-to-noise ratio less than the highest signal-to-noise ratio by a predetermined amount as pilot pairs that are affected by burst noise.

6. The method of claim 5, further comprising selecting a pilot pair whose equalized pilot has the highest signal-to-noise ratio among the plurality of different pilot pairs for use in the channel estimation computation.

7. A method comprising:
   receiving an orthogonal frequency division multiplex transmission including pilots transmitted at different instances of time but on the same subcarrier during a predetermined time interval such that there are a plurality of different pairs of pilots that are on the same subcarriers during the predetermined time interval;
   for each pair of pilots, generating an equalized pilot using received values for first and second pilots of the pair by dividing a received value for the second pilot by the received value for the first pilot;
   computing a signal-to-noise ratio for each equalized pilot;
   determining which pilots, if any, are affected by burst noise by, for each possible pilot pair, determining if the equalized pilot of a pilot pair has a signal-to-noise ratio lower than that of the equalized pilots of other pilot pairs in the plurality of different pairs of pilots; and
   performing a channel response computation without any pilots determined to be affected by burst noise.

8. The method of claim 7, wherein computing the signal-to-noise ratio comprises:
   determining a closest point in a reference signal constellation for each equalized pilot and an error between the equalized pilot and its closest point in the reference signal constellation; and
   computing the signal-to-noise ratio based on the error determined for each equalized pilot.

9. The method of claim 8, wherein computing the signal-to-noise ratio comprises computing a magnitude of the error for each equalized pilot, and computing the signal-to-noise ratio based on the magnitude of the error.

10. The method of claim 7, wherein determining which pilots are affected by burst noise further comprises selecting a pilot pair whose equalized pilot has a highest signal-to-noise ratio, designating pilot pairs having an equalized pilot with a signal-to-noise ratio less than the highest signal-to-noise ratio by a predetermined amount as pilot pairs that are affected by burst noise.

11. The method of claim 10, further comprising selecting a pilot pair whose equalized pilot has the highest signal-to-noise ratio among the plurality of different pilot pairs for use in the channel estimation computation.

12. An apparatus comprising:
   a transform module configured to convert a time-domain receive signal associated with reception of an orthogonal frequency division multiplex transmission into values for a plurality of frequency bins that span a frequency band of interest, the orthogonal frequency division multiplex transmission including pilots transmitted at different instances of time but on the same subcarrier during a predetermined time interval such that there are a plurality of different pairs of pilots that are on the same subcarriers during the predetermined time interval; and
   a processor configured to:
      for each possible pair of pilots, generate an equalized pilot using received values for first and second pilots of the pair by dividing a received value for the second pilot by a received value for the first pilot;
      compute a signal-to-noise ratio for each equalized pilot;
      determine which pilots, if any, are affected by burst noise by comparing the signal-to-noise ratio among the plurality of equalized pilots; and
      remove from a channel response computation any pilots determined to be affected by burst noise.

13. The apparatus of claim 12, wherein the processor is configured to compute the signal-to-noise ratio by:
   determining a closest point in a reference signal constellation for each equalized pilot and an error between the equalized pilot and its closest point in the reference signal constellation; and
   computing the signal-to-noise ratio based on the error determined for each equalized pilot.

14. The apparatus of claim 13, wherein the processor is configured to compute the signal-to-noise ratio by computing a magnitude of the error for each equalized pilot, and computing the signal-to-noise ratio based on the magnitude of the error.

15. The apparatus of claim 12, wherein the processor is configured to determine which pilots are affected by burst noise by determining, for each pilot pair, if the equalized pilot of a pilot pair has a signal-to-noise ratio lower than that of the equalized pilot of other pilot pairs in the plurality of different pairs of pilots.

16. The apparatus of claim 12, wherein the processor is configured to determine which pilots are affected by burst noise by selecting a pilot pair whose equalized pilot has a highest signal-to-noise ratio, designating pilot pairs having an equalized pilot with a signal-to-noise ratio less than the highest signal-to-noise ratio by a predetermined amount as pilot pairs that are affected by burst noise.

17. The apparatus of claim 16, wherein the processor is further configured to select a pilot pair whose equalized pilot has the highest signal-to-noise ratio among the plurality of different pilot pairs for use in the channel estimation computation.

* * * * *